(12) United States Patent
Tell

(10) Patent No.: US 10,456,930 B2
(45) Date of Patent: Oct. 29, 2019

(54) VACUUM EJECTOR DEVICE

(71) Applicant: PIAB AB, Täby (SE)

(72) Inventor: Peter Tell, Åkersberga (SE)

(73) Assignee: PIAB AB, Taby (SE)

( * ) Notice: Subject to any disclaimer, the term of this patent is extended or adjusted under 35 U.S.C. 154(b) by 0 days.

(21) Appl. No.: 16/095,040

(22) PCT Filed: Apr. 19, 2017

(86) PCT No.: PCT/EP2017/059248
§ 371 (c)(1),
(2) Date: Oct. 19, 2018

(87) PCT Pub. No.: WO2017/182503
PCT Pub. Date: Oct. 26, 2017

(65) Prior Publication Data
US 2019/0143536 A1 May 16, 2019

(30) Foreign Application Priority Data
Apr. 21, 2016 (EP) ..................... 16166439

(51) Int. Cl.
*B25J 15/06* (2006.01)
*F04F 5/20* (2006.01)
(Continued)

(52) U.S. Cl.
CPC ............ *B25J 15/0675* (2013.01); *F04F 5/20* (2013.01); *F04F 5/44* (2013.01); *F04F 5/52* (2013.01)

(58) Field of Classification Search
CPC .... B25J 15/0675; B25J 15/0641; B25J 9/162; F04F 5/20
(Continued)

(56) References Cited

U.S. PATENT DOCUMENTS 2,200,800 A * 5/1940 Miller .................. B66C 1/0212
271/106
3,568,959 A * 3/1971 Blatt .................... B65G 47/911
294/64.2
(Continued)

FOREIGN PATENT DOCUMENTS

DE 28 52 681 A1 6/1980
DE 195 16 740 A1 11/1996
(Continued)

OTHER PUBLICATIONS

International Search Report and Written Opinion for corresponding Patent Application No. PCT/EP2017/059248 dated Jul. 12, 2017.

*Primary Examiner* — Paul T Chin
(74) *Attorney, Agent, or Firm* — Renner, Otto, Boisselle & Sklar, LLP

(57) ABSTRACT

A vacuum ejector device (2) for generating at least partial vacuum to be supplied to a gripping member (4), comprising a device body (6) having an elongated shape along a longitudinal axis A. A movable sealing and venting element (24) is provided and is structured to selectively substantially close and seal, in a sealing position, a vacuum duct (16) when the air supply is activated, and to open or vent said vacuum duct to release or vent via a venting duct (26), in a venting position, the vacuum within the gripping member (4) when the vacuum source or air supply is deactivated. The sealing and venting element (24) is arranged essentially at the longitudinal axis A, and that the venting duct (26) is arranged and provides for fluid communication between the sealing and venting element (24) and a venting outlet port (28) provided at a long side of said elongated device body (6).

11 Claims, 2 Drawing Sheets

(51) Int. Cl.
*F04F 5/44* (2006.01)
*F04F 5/52* (2006.01)

(58) Field of Classification Search
USPC ........................................ 294/64.2, 183, 185
See application file for complete search history.

(56) References Cited

U.S. PATENT DOCUMENTS

| | | | | |
|---|---|---|---|---|
| 3,648,853 | A | * | 3/1972 | Winne ..................... B23Q 7/04 |
| | | | | 414/744.3 |
| 3,912,317 | A | * | 10/1975 | Ohnaka .................... B25J 9/144 |
| | | | | 294/186 |
| 5,928,537 | A | * | 7/1999 | Fortune .............. H05K 13/0447 |
| | | | | 219/228 |
| 6,264,259 | B1 | * | 7/2001 | Fortune ................ B25B 11/007 |
| | | | | 294/186 |
| 7,950,422 | B2 | | 5/2011 | Perlman et al. |
| 2017/0203444 | A1 | * | 7/2017 | Rickhardsson ...... B25J 15/0625 |

FOREIGN PATENT DOCUMENTS

| | | |
|---|---|---|
| DE | 200 11 839 U1 | 12/2000 |
| EP | 1064464 | 1/2001 |
| EP | 1 752 264 A2 | 2/2007 |

\* cited by examiner

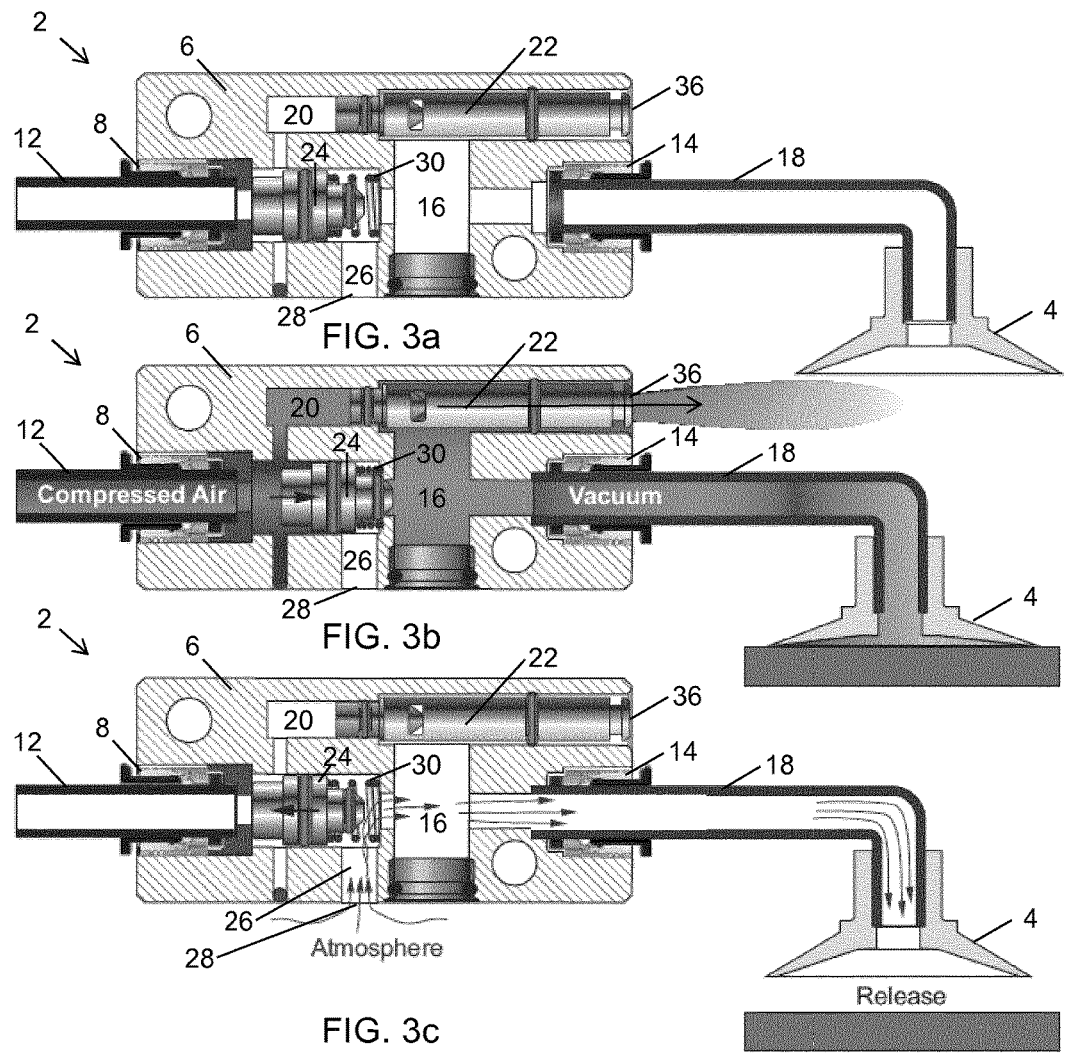
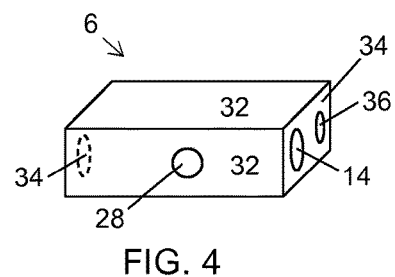 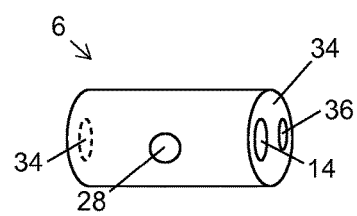
FIG. 4  FIG. 5

VACUUM EJECTOR DEVICE

TECHNICAL FIELD

The present disclosure relates to a vacuum ejector device that is driven by compressed air in order to generate a negative pressure applicable for vacuum cups or similar devices.

BACKGROUND

The present invention relates generally to material handling systems and, more particularly, to vacuum devices for vacuum cup assemblies of material handling systems that are engaged with the objects and substantially sealed thereto via operation of a vacuum source or pneumatic device connected to the vacuum devices. It is known to provide a material handling system that includes vacuum cups or the like that are adapted to be moved into engagement with an object, such as a substantially flat object or panel or the like, and to lift and move the object to a desired location. Such vacuum cups or suction cups may be moved into engagement with the object, and a vacuum source may be actuated to create a vacuum between the object and the cup such that the object is retained to the cup as it is transported to the targeted area.

The vacuum generated at the cup may be provided by a venturi nozzle, whereby pressurized air is supplied or provided to a venturi nozzle in relation to the cup and the air forced through the venturi nozzle creates a vacuum at the cup to seal the cup to the object surface.

The venturi nozzle has an inlet port connected to the air supply and an exit port through which the air is blown. The internal cavity defined by the vacuum cup and object is in fluid communication with the venturi nozzle so that air is drawn out of the cavity as the air is blown through the venturi nozzle. When the air supply is deactivated, the vacuum within the cup cavity may dissipate through a vent port that connects the vacuum cup cavity to the outside of the device, and when the vacuum has dissipated a sufficient amount the vacuum cup may be released from the object.

Prior art devices are known from e.g. EP-1064464 where it is disclosed a vacuum ejector pump for generating a negative pressure used for transportation or lifting purposes. And in, U.S. Pat. No. 7,950,422 where it is disclosed an auto-release vacuum device for a material handling system.

Although presently used systems have many advantages the used devices are sometimes considered to be too bulky and not user-friendly. In addition the deactivation time, i.e. the time to vent the vacuum cup, is in some occasions considered too long.

The object of the present invention is to achieve an improved vacuum ejector device that eliminates, or at least mitigates, the above stated drawbacks, by being more user-friendly to handle, and having shorter deactivation times.

SUMMARY

The above-mentioned object is achieved by the present invention according to the independent claim.

Preferred embodiments are set forth in the dependent claims.

Thus, the present disclosure relates to a vacuum ejector device for generating at least partial vacuum to be supplied to a gripping member, e.g. a suction cup. The device comprises a device body having an elongated shape along a longitudinal axis A, an air inlet port provided at a first end of the device body and being structured to receive pressurized air from a pressurized air supply source, and a vacuum connection port provided at a second end of the device body, opposite the first end, in fluid communication to a vacuum duct. The vacuum connection port is structured to receive and connect one end of a vacuum tube that in its turn is in fluid communication to the gripping member. The air inlet port and the vacuum connection port are arranged essentially along the longitudinal axis A, and structured such that the pressurized air tube and the vacuum tube are essentially in-line and oriented along the longitudinal axis A. A vacuum generating duct is provided and being in fluid communication to the air inlet port, and at least one vacuum generating member is positioned at or in or partially in the vacuum generating duct. The vacuum duct connects to and is in fluid communication with the vacuum generating duct and terminates at the vacuum connection port, and that the vacuum generating member is configured to generate at least partial vacuum to the vacuum duct when the pressurized air supply is activated. Furthermore, a movable sealing and venting element is provided and is structured to selectively substantially close and seal, in a sealing position, the vacuum duct when the air supply is activated, and to open or vent the vacuum duct to release or vent via a venting duct, in a venting position, the vacuum within the gripping member when the vacuum source or air supply is deactivated. The sealing and venting element is arranged essentially at the longitudinal axis A, and that the venting duct, which is relatively short, is arranged and provides for fluid communication between the sealing and venting element and a venting outlet port provided at a long side of the device body Herein, this disclosure, the expression "arranged essentially at the longitudinal axis" also includes some offset.

According to one embodiment, in addition to the above embodiment, the venting duct has a substantially perpendicular main direction in relation the longitudinal axis A of the vacuum ejector device body.

Herein, this disclosure, the expression "that the venting duct has a substantially perpendicular main direction in relation to the longitudinal axis A" also includes variations from perpendicular within an angle of ±45°.

The elongated shape of the vacuum ejector device and that the air inlet port, the movable sealing and venting element, and the vacuum connection port essentially are arranged at the longitudinal axis A of the device, in combination with that the venting duct is relatively short, since the venting outlet port is provided at a long side of the device body a compact, user-friendly device is obtained having short venting times.

BRIEF DESCRIPTION OF THE DRAWINGS

FIGS. 3a-3c show cross-sectional views schematically illustrating one embodiment of the vacuum ejector device according to the present invention, in different operational states.

FIGS. 4 and 5 are perspective views schematically illustrating two different shapes of the vacuum ejector device according to the present invention.

DETAILED DESCRIPTION

Figure 1A:
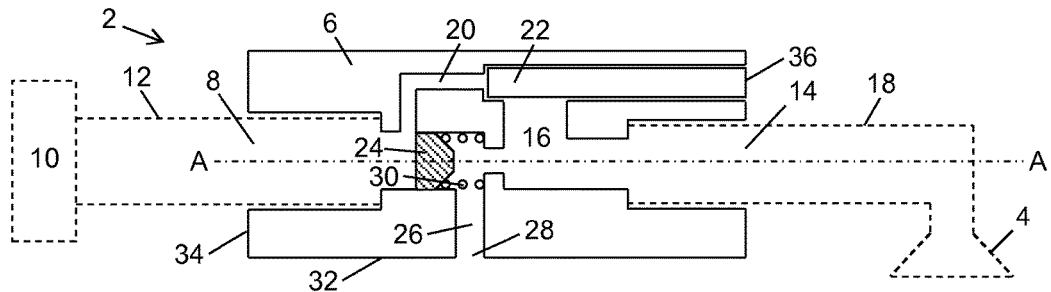
FIGS. 1a and 1b are cross-sectional views schematically illustrating one embodiment of the vacuum ejector device according to the present invention, in two different operational states.

The vacuum ejector device will now be described in detail with references to the appended figures. Throughout the figures the same, or similar, items have the same reference signs. Moreover, the items and the figures are not necessarily to scale, emphasis instead being placed upon illustrating the principles of the invention.

Referring now to the drawings and the illustrative embodiments depicted therein, an elongated vacuum ejector device structured to be in a fluid connection to a gripping member 4 comprising at least one vacuum cup and operable to create a vacuum or partial vacuum within the gripping member (vacuum cup) 4 when the vacuum cup is engaged with a surface of an object. Throughout the description the gripping member is exemplified by a vacuum cup, however any other device capable of being controlled by under pressure may be applied in relation to the vacuum ejector device.

The vacuum ejector device is preferably mountable to a support assembly of a material handling system, which is operable to move the support assembly (or multiple vacuum cup assemblies or suction cups) into engagement with an object, where the vacuum cup may engage and seal to the object for picking up and moving the object. The material handling system includes an air supply source 10 providing pressurized air to the vacuum ejector device that in turn is connected to the vacuum cup to achieve a substantially vacuum seal attachment of the vacuum cup 4 to the object. The vacuum ejector device 2 includes a sealing and venting element 18 that is openable to atmosphere in response to deactivation of a vacuum duct to substantially vent the vacuum from the vacuum cup when the air supply source is deactivated, as discussed below. In the illustrated embodiment, the vacuum ejector device comprises at least one venturi nozzle that is connected to or in fluid communication with a pressurized air supply, such that when the pressurized air supply is activated, pressurized air flows through the venturi device to generate a vacuum in the vacuum duct and vacuum cup, as also discussed below.

Figure 1B:
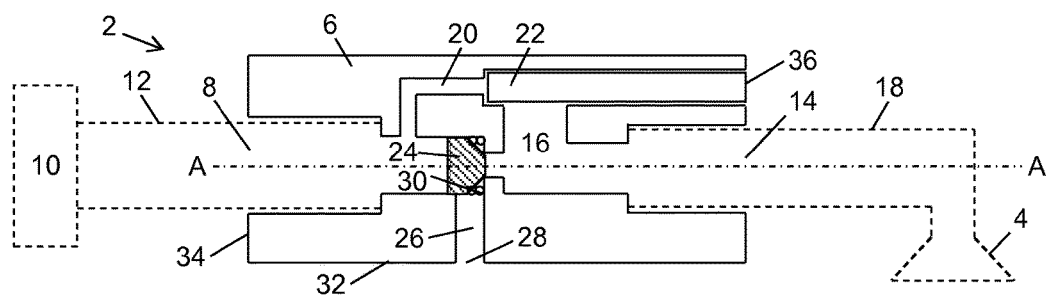

With references to FIGS. 1a and 1b that illustrate schematic cross-sectional side views of the vacuum ejector device 2 according to one embodiment of the present invention. FIG. 1a illustrates the device in a venting position and FIG. 1b illustrates the device in a sealing position.

The vacuum ejector device is adapted for generating at least partial vacuum to be supplied to a gripping member 4, e.g. a vacuum cup, and the device comprises a device body 6 having an elongated shape along a longitudinal axis A.

The vacuum ejector device comprises an air inlet port 8 provided at a first end of the device body 6 and being structured to receive pressurized air from a pressurized air supply source 10 via a pressurized air tube 12.

A vacuum connection port 14 is provided at a second end of the device body 6, opposite the first end, and being in fluid communication to a vacuum duct 16. The vacuum connection port 14 is structured to receive and connect one end of a vacuum tube 18 that in its turn is in fluid communication to the gripping member (vacuum cup) 4. The air inlet port 8 and the vacuum connection port 14 are arranged essentially along the longitudinal axis A, and structured such that the pressurized air tube 12 and the vacuum tube 18 are essentially in-line and oriented along the longitudinal axis A.

The vacuum ejector device further comprises a vacuum generating duct 20 in fluid communication to the air inlet port 8, and at least one vacuum generating member 22 positioned at or in or partially in the vacuum generating duct.

The vacuum duct 16 connects to and is in fluid communication with the vacuum generating duct 20 and terminates at the vacuum connection port 14 and is thus in fluid communication with the vacuum cup. The vacuum generating member 22 is configured to generate at least partial vacuum to the vacuum duct when the pressurized air supply is activated. The vacuum generating member 22 includes a venture nozzle and works in accordance with known technique for generating under pressure or vacuum by applying pressurized air to the venture nozzle.

A movable sealing and venting element 24 is provided and is structured to selectively substantially close and seal, in a sealing position which is illustrated in FIG. 1b, the vacuum duct 16 when the air supply is activated, and to open or vent the vacuum duct to release or vent via a venting duct 26, in a venting position which is illustrated in FIG. 1b, the vacuum within the vacuum cup when the vacuum source or air supply is deactivated. The sealing and venting element 24 is arranged essentially at the longitudinal axis A which is important in order to achieve user-friendly and compact device.

The venting duct 26 is arranged and provides for fluid communication between the sealing and venting element 24 and a venting outlet port 28 provided at a long side of the elongated device body 6, and that the venting duct 26 has a substantially perpendicular main direction in relation the longitudinal axis A of the vacuum ejector device body. This in combination with that the venting duct is relatively short is a presumption to achieve an almost instantaneous venting of vacuum within the vacuum cup when the air supply is deactivated.

The sealing and venting element 24 is arranged such that it is subjected to pressurized air supplied to the air inlet port 8. A biasing element 30 is provided structured to urge the sealing and venting element towards the venting position. When pressurized air is supplied to the inlet port 8 and thereby to the sealing and venting element 24, and the pressure is such that it overcomes the biasing force provided by the biasing element, then the sealing and venting element is urged towards the sealing position and vacuum or near vacuum is achieved in the vacuum duct.

In one embodiment, which is illustrated in FIGS. 1a and 1b, and also in FIGS. 3a-3c, the biasing element is a helix spring.

Figure 2A:
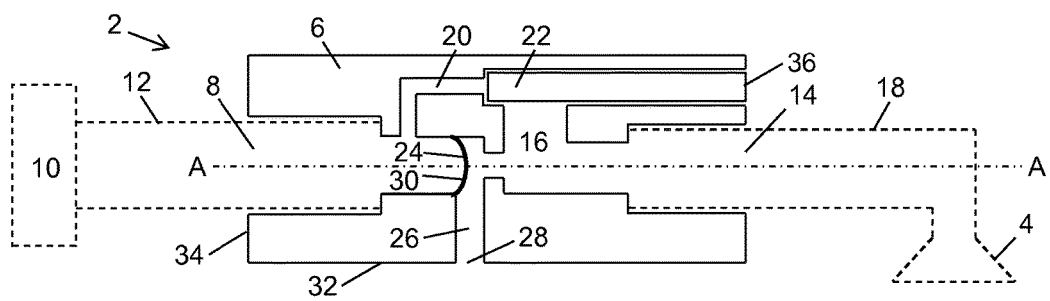
FIGS. 2a and 2b are cross-sectional views schematically illustrating another embodiment of the vacuum ejector device according to the present invention, in two different operational states.
Figure 2B:
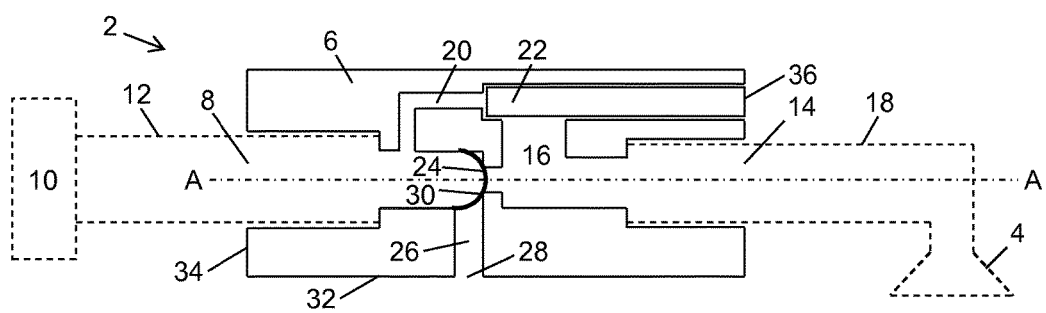

Another embodiment is illustrated in FIGS. 2a and 2b. The only differentiating feature in comparison to the embodiment illustrated in FIGS. 1a and 1b is the structure of the sealing and venting element 24. For the description of all other features it is referred to the description of the embodiment illustrated in FIGS. 1a and 1b.

In the embodiment of FIGS. 2a and 2b the sealing and venting element is a membrane member provided with the biasing element. FIG. 2a shows the device in a venting position and FIG. 2b in a sealing position. The membrane member 24 has elastic properties such that it may expand when subjected to pressurized air to a predetermined extend that it completely seals off the opening to the vacuum duct. The biasing element may in this embodiment be an inherent feature of the membrane member, or may be a separate element provided in relation to the membrane member.

For both embodiments the sealing and venting element 24 is structured to be movable along the longitudinal axis A between its sealing and venting positions.

The at least one vacuum generating device 22 has an elongated extension and being arranged along and parallel to the longitudinal axis of the device body. This is illustrated in FIGS. 1-3.

The device body 6 includes or defines a vacuum generating duct 20 there through. The vacuum generating duct 20 defines an outlet port and an inlet port at opposite ends of the vacuum generating duct 20. A vacuum generating member 22 is positioned at or in or partially in the vacuum generating duct 20 and is connectable to an air tube 12 via air inlet port 8.

The vacuum generating member 22 comprises a venturi nozzle that is positioned along duct 20 with an outlet end at outlet port and an inlet or entry end at or near the inlet port. A vacuum duct 16 connects to and is in fluid communication with the vacuum generating duct 20 and to the vacuum cup 12 and also to the sealing and venting element 24. The vacuum duct 16 terminates at a vacuum connection port 14 for connecting the device body 6 to the vacuum cup 4 via a vacuum tube 18 connected to the connection port 14.

The venturi nozzle includes a nozzle body and a passageway extending longitudinally along the nozzle body, and along and parallel to the longitudinal axis of the device body 6. The nozzle body includes at least one vacuum port to provide fluid communication through nozzle body to a passageway leading to an air exit port 36. When venturi nozzle is positioned within the vacuum generating duct 20 of body 6, vacuum port or ports is/are positioned generally at and in fluid communication with the vacuum duct 16 of body 6. As is known in the vacuum cup and venturi nozzle art, the duct of the venturi nozzle comprises a narrowing and widening passageway to increase the air flow rate through the venturi nozzle when the air supply source is activated, whereby air flow through the venturi nozzle draws air through vacuum ports and from vacuum duct 16 to create a vacuum or partial vacuum in the vacuum duct 26 when the vacuum duct is not vented, as discussed below.

FIGS. 3a-3c show cross-sectional views schematically illustrating one embodiment of the vacuum ejector device, in different operational states. This embodiment is similar to the device illustrated in FIGS. 1a and 1b, and as a complement to the description below it is referred to the above description of those figures.

FIG. 3a illustrates the device in a non-activated state, i.e. no pressurized air is supplied to the device. The sealing and venting element 24 is in its venting position where it is biased by the biasing element 30 such that the vacuum duct 16 is in fluid communication with the venting duct 26.

In FIG. 3b pressurized air is supplied to the device via air tube 12. When the force from the pressurized air exceeds the biasing force the sealing and venting element 24 is moved (to the right in the figure) to its sealing position where it effectively seals the fluid connection between the vacuum duct and the venting duct.

Simultaneously, pressurized air is supplied to the vacuum generating duct 20 and through the vacuum generating member 22 and out through the air exit port 36, which is indicated by an arrow, whereas at least partial pressure is generated within the vacuum duct, and thus in the gripping member 4, e.g. a vacuum cup, that may be attached to an object schematically illustrated as a flat object.

In FIG. 3c the supply of pressurized air is deactivated and the sealing and venting element 24 is moved (to the left in the figure) to its venting position allowing air to flow into the vacuum duct and further to the gripping device, e.g. a vacuum cup, that releases an object attached by the under pressure.

FIGS. 4 and 5 schematically illustrate two different shapes of the device body 4. The device body 4 is preferably a unitary body being for example cast or moulded or otherwise formed of a metallic material, such as aluminium or the like, or a polymeric material, such as engineering plastic or the like, and has the ducts bored or drilled through the unitary body to define the ducts within the device body.

With reference to the schematic illustration in FIG. 4 the device body 4 is provided with side walls 34 having essentially flat extensions and being oriented in directions in parallel to the longitudinal axis A and in particular the device body 4 has a three-dimensional shape of an elongated rectangular cuboid having four rectangular side walls 32, and two rectangular end walls 34. The air inlet port 8 is provided at one of the end walls, and the vacuum connection port 14 is provided at the other end wall 34.

With reference to the schematic illustration in FIG. 5 the device body 4 has a three-dimensional shape of an elongated cylinder having an essentially circular or elliptical cross-section, and provided with two circular/elliptical end walls 34. The air inlet port 8 is provided at one of the end walls, and the vacuum connection port 14 is provided at the other end wall 34.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A vacuum ejector device for generating at least partial vacuum to be supplied to a gripping member, comprising a device body having an elongated shape along a longitudinal axis A, the vacuum ejector device comprises an air inlet port provided at a first end of the device body and being structured to receive pressurized air from a pressurized air supply source via a pressurized air tube, a vacuum connection port provided at a second end of the device body, opposite said first end, in fluid communication to a vacuum duct, the vacuum connection port is structured to receive and connect one end of a vacuum tube that in its turn is in fluid communication to said gripping member, wherein said air inlet port and said vacuum connection port are arranged essentially along said longitudinal axis A, and structured such that said pressurized air tube and said vacuum tube are essentially in-line and oriented along said longitudinal axis A, a vacuum generating duct in fluid communication to said air inlet port, and at least one vacuum generating member positioned at or in or partially in the vacuum generating duct, the vacuum duct connects to and is in fluid communication with the vacuum generating duct and terminates at said vacuum connection port, said vacuum generating member is configured to generate at least partial vacuum to said vacuum duct when the pressurized air supply is activated, a movable sealing and venting element is provided and is structured to selectively substantially close and seal, in a sealing position, said vacuum duct when the air supply is activated, and to open or vent said vacuum duct to release or vent via a venting duct, in a venting position, the vacuum within the gripping member when the vacuum source or air supply is deactivated, characterized in that the sealing and venting element is arranged essentially at said longitudinal axis A, and that the venting duct is arranged and provides for fluid communication between the sealing and venting element and a venting outlet port provided at a long side of said elongated device body.

2. The vacuum ejector device according to claim 1, wherein said sealing and venting element is arranged such that it is subjected to pressurized air supplied to said air inlet port, and a biasing element, is provided structured to urge said sealing and venting element towards the venting position, and wherein when pressurized air is supplied to the inlet port and thereby to the sealing and venting element, and the pressure is such that it overcomes the biasing force provided by the biasing element, and the sealing and venting element is urged towards the sealing position.

3. The vacuum ejector device according to claim 2, wherein said biasing element is a helix spring.

4. The vacuum ejector device according to claim 1, wherein said sealing and venting element is a membrane member provided with said biasing element.

5. The vacuum ejector device according to claim 1, wherein said sealing and venting element is structured to be movable along the longitudinal axis A between its sealing and venting positions.

6. The vacuum ejector device according to claim 1, wherein said at least one vacuum generating device has an elongated extension being arranged along and essentially parallel to the longitudinal axis of the device body.

7. The vacuum ejector device according to claim 1, wherein said device body is a unitary body made from a polymeric material, and has the ducts bored or drilled through the unitary body to define the ducts within the device body.

8. The vacuum ejector device according to claim 1, wherein said device body is provided with side walls having essentially flat extensions and being oriented in directions in parallel to the longitudinal axis A.

9. The vacuum ejector device according to claim 1, wherein said device body has a three-dimensional shape of an elongated rectangular cuboid having four rectangular side walls and two rectangular end walls wherein each of said air inlet port and said vacuum cup connection port is provided at a respective end wall.

10. The vacuum ejector device according to claim 1, wherein said device body has a three-dimensional shape of an elongated cylinder having an essentially circular or elliptical cross-section, and provided with two circular/elliptical end walls, wherein each of said air inlet port and said vacuum connection port, is provided at a respective end wall.

11. The vacuum ejector device according to claim 1, wherein said gripping member comprises at least one vacuum cup.

* * * * *